(12) United States Patent
Smith et al.

(10) Patent No.: US 8,114,182 B2
(45) Date of Patent: Feb. 14, 2012

(54) AUTHORIZED FILTER SERVICING AND REPLACEMENT

(75) Inventors: Guillermo Alberto Smith, Fitchburg, WI (US); Chirag D. Parikh, Madison, WI (US); Kwok-Lam Ng, Madison, WI (US); Roger L. Zoch, McFarland, WI (US); Jim L. Alonzo, Verona, WI (US); Brian W. Schwandt, Fort Atkinson, WI (US); J. Bruce Schelkopf, Zionsville, IN (US); Barry M. Verdegan, Stoughton, WI (US); Kelly R. Schmitz, Brentwood, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

(21) Appl. No.: 13/157,384

(22) Filed: Jun. 10, 2011

(65) Prior Publication Data

US 2011/0239600 A1 Oct. 6, 2011

Related U.S. Application Data

(62) Division of application No. 11/940,626, filed on Nov. 15, 2007, now Pat. No. 7,959,714.

(51) Int. Cl.
*B01D 50/00* (2006.01)
(52) U.S. Cl. ....... 55/385.3; 55/323; 55/342.1; 55/350.1; 55/502; 55/521
(58) Field of Classification Search .............. 55/385.3, 55/323, 330, 341.1, 342.1, 343, 342, 419, 55/428–429, 482–484, 490, 502, 503, 510, 55/521; 210/232, 238, 282, 444, 450, 493.2; 123/198 E
See application file for complete search history.

(56) References Cited

U.S. PATENT DOCUMENTS

| | | | |
|---|---|---|---|
| 1,761,944 A | 6/1930 | Taylor |
| 2,569,316 A | 9/1951 | Jerman |
| 2,608,376 A | 8/1952 | Adams |
| 2,609,835 A | 9/1952 | Horvay |
| 2,646,071 A | 7/1953 | Wagner |
| 2,667,895 A | 2/1954 | Pool et al. |
| 2,949,931 A | 8/1960 | Ruppright |
| 3,026,903 A | 3/1962 | Roach |
| 3,217,736 A | 11/1965 | Voss |
| 3,495,620 A | 2/1970 | Raimondi et al. |
| 3,645,398 A | 2/1972 | Flocco |
| 3,755,527 A | 8/1973 | Keller |
| 3,841,953 A | 10/1974 | Lohkamp et al. |
| 3,904,798 A | 9/1975 | Vogt et al. |

(Continued)

FOREIGN PATENT DOCUMENTS

EP 0325854 4/1993

(Continued)

OTHER PUBLICATIONS

S. F. Moses and K. M. Ng, "*A Visual Study of the Breakdown of Emulsions in Porous Coalescers*", Chemical Engineering Science, vol. 40, No. 12; pp. 2339-2350, 1985.

(Continued)

*Primary Examiner* — Jason M Greene
*Assistant Examiner* — Karla Hawkins
(74) *Attorney, Agent, or Firm* — Andrus, Sceales, Starke & Sawall, LLP

(57) ABSTRACT

A method is provided for servicing a filter, and structure is provided disabling assembly of the filter unless an authorized replacement filter element is used.

20 Claims, 7 Drawing Sheets

U.S. PATENT DOCUMENTS

| | | |
|---|---|---|
| 3,949,130 A | 4/1976 | Sabee et al. |
| 3,971,373 A | 7/1976 | Braun |
| 3,972,759 A | 8/1976 | Buntin |
| 3,978,185 A | 8/1976 | Buntin et al. |
| 4,048,364 A | 9/1977 | Harding et al. |
| 4,078,124 A | 3/1978 | Prentice |
| 4,192,919 A | 3/1980 | Raghavachari |
| 4,253,954 A | 3/1981 | Midkiff et al. |
| 4,275,759 A | 6/1981 | Huang |
| 4,282,097 A | 8/1981 | Kuepper et al. |
| 4,401,093 A | 8/1983 | Gates, Jr. et al. |
| 4,416,782 A | 11/1983 | Kerres |
| 4,524,000 A | 6/1985 | Clayfield et al. |
| 4,668,393 A | 5/1987 | Stone |
| 4,689,058 A | 8/1987 | Vogt et al. |
| 4,726,901 A | 2/1988 | Pall et al. |
| 4,792,113 A | 12/1988 | Eidsmore |
| 4,859,349 A | 8/1989 | Clark et al. |
| 4,874,012 A | 10/1989 | Velie |
| 4,874,399 A | 10/1989 | Reed et al. |
| 4,878,929 A | 11/1989 | Tofsland et al. |
| 4,892,667 A | 1/1990 | Parker, III et al. |
| 4,993,517 A | 2/1991 | Leipelt et al. |
| 4,995,974 A | 2/1991 | Lorey et al. |
| 5,035,797 A | 7/1991 | Janik |
| 5,061,170 A | 10/1991 | Allen et al. |
| 5,075,068 A | 12/1991 | Milligan et al. |
| 5,122,048 A | 6/1992 | Deeds |
| 5,129,371 A | 7/1992 | Rosalik, Jr. |
| 5,145,689 A | 9/1992 | Allen et al. |
| 5,174,907 A | 12/1992 | Chown et al. |
| 5,201,301 A | 4/1993 | Re |
| 5,205,848 A | 4/1993 | Blanc et al. |
| 5,227,172 A | 7/1993 | Deeds |
| 5,236,641 A | 8/1993 | Allen et al. |
| 5,254,297 A | 10/1993 | Deeds |
| 5,269,670 A | 12/1993 | Allen et al. |
| 5,273,565 A | 12/1993 | Milligan et al. |
| 5,296,061 A | 3/1994 | Ando et al. |
| 5,306,321 A | 4/1994 | Osendorf |
| 5,320,136 A | 6/1994 | Morris et al. |
| 5,329,913 A | 7/1994 | Suzuki et al. |
| 5,340,479 A | 8/1994 | Szczepanski et al. |
| 5,401,458 A | 3/1995 | Wadsworth et al. |
| 5,409,642 A | 4/1995 | Allen et al. |
| 5,411,576 A | 5/1995 | Jones et al. |
| 5,419,953 A | 5/1995 | Chapman |
| 5,427,597 A | 6/1995 | Osendorf |
| 5,470,663 A | 11/1995 | Wadsworth et al. |
| 5,472,481 A | 12/1995 | Jones et al. |
| 5,480,547 A | 1/1996 | Williamson et al. |
| 5,501,872 A | 3/1996 | Allen et al. |
| 5,564,401 A | 10/1996 | Dickson |
| 5,591,335 A | 1/1997 | Barboza et al. |
| 5,605,706 A | 2/1997 | Allen et al. |
| 5,618,566 A | 4/1997 | Allen et al. |
| 5,667,562 A | 9/1997 | Midkiff |
| 5,672,232 A | 9/1997 | Clack |
| 5,681,469 A | 10/1997 | Barboza et al. |
| 5,695,637 A | 12/1997 | Jiang et al. |
| 5,733,581 A | 3/1998 | Barboza et al. |
| 5,800,706 A | 9/1998 | Fischer |
| 5,913,851 A | 6/1999 | Gryskiewicz et al. |
| 5,972,063 A | 10/1999 | Dudrey et al. |
| 5,994,482 A | 11/1999 | Georgellis et al. |
| 6,019,809 A | 2/2000 | Kahlbaugh et al. |
| 6,073,618 A | 6/2000 | Sanders et al. |
| 6,117,322 A | 9/2000 | Miller et al. |
| 6,146,580 A | 11/2000 | Bontaites, Jr. |
| 6,171,369 B1 | 1/2001 | Schultink et al. |
| 6,179,890 B1 | 1/2001 | Ramos et al. |
| 6,247,463 B1 | 6/2001 | Fedorowicz et al. |
| 6,279,556 B1 | 8/2001 | Busen et al. |
| 6,290,738 B1 | 9/2001 | Holm |
| 6,293,268 B1 | 9/2001 | Mammarella |
| 6,314,344 B1 | 11/2001 | Sauer et al. |
| 6,315,805 B1 | 11/2001 | Strauss |
| 6,319,402 B1 | 11/2001 | Schwandt et al. |
| 6,342,283 B1 | 1/2002 | Mozelack et al. |
| 6,354,283 B1 | 3/2002 | Hawkins et al. |
| 6,358,417 B1 | 3/2002 | Aune et al. |
| 6,387,141 B1 | 5/2002 | Hollingsworth et al. |
| 6,387,144 B1 | 5/2002 | Jaroszczyk et al. |
| 6,402,798 B1 | 6/2002 | Kallsen et al. |
| 6,418,918 B2 | 7/2002 | Mammarella |
| 6,422,396 B1 | 7/2002 | Li et al. |
| 6,423,227 B1 | 7/2002 | Allen et al. |
| 6,432,175 B1 | 8/2002 | Jones et al. |
| 6,478,018 B2 | 11/2002 | Fedorowicz et al. |
| 6,478,019 B2 | 11/2002 | Fedorowicz et al. |
| 6,488,801 B1 | 12/2002 | Bodaghi et al. |
| 6,505,615 B2 | 1/2003 | Pietschner |
| 6,521,555 B1 | 2/2003 | Bodaghi et al. |
| 6,533,712 B1 | 3/2003 | Miller et al. |
| 6,544,310 B2 | 4/2003 | Badeau et al. |
| 6,568,540 B1 | 5/2003 | Holzmann et al. |
| 6,576,045 B2 | 6/2003 | Liu et al. |
| 6,613,268 B2 | 9/2003 | Haynes et al. |
| 6,626,163 B1 | 9/2003 | Busen et al. |
| 6,662,842 B2 | 12/2003 | Mozelack et al. |
| 6,684,864 B1 | 2/2004 | Busen et al. |
| 6,736,274 B2 | 5/2004 | Tremblay et al. |
| 6,811,588 B2 | 11/2004 | Niakin |
| 6,838,402 B2 | 1/2005 | Harris et al. |
| 6,860,917 B2 | 3/2005 | Henrichsen et al. |
| 6,872,431 B2 | 3/2005 | Kahlbaugh et al. |
| 6,916,395 B2 | 7/2005 | Aune et al. |
| 6,932,923 B2 | 8/2005 | Nguyen |
| 6,938,781 B2 | 9/2005 | Aune et al. |
| 6,989,193 B2 | 1/2006 | Haile et al. |
| 7,080,636 B2 | 7/2006 | Knaus et al. |
| 7,152,589 B2 | 12/2006 | Ekeroth et al. |
| 7,156,901 B2 | 1/2007 | Hallgren et al. |
| 7,185,643 B2 | 3/2007 | Gronberg et al. |
| 7,238,216 B2 | 7/2007 | Malgorn et al. |
| 7,406,960 B2 | 8/2008 | Knauf et al. |
| 7,582,130 B2 | 9/2009 | Ng et al. |
| 7,614,390 B2 | 11/2009 | Holzmann et al. |
| 7,615,151 B2 | 11/2009 | Wieczorek et al. |
| 7,674,425 B2 | 3/2010 | Schwandt et al. |
| 7,828,869 B1 | 11/2010 | Parikh et al. |
| 2002/0046656 A1 | 4/2002 | Benson et al. |
| 2002/0070471 A1 | 6/2002 | Lee |
| 2002/0073667 A1 | 6/2002 | Barris et al. |
| 2002/0092423 A1 | 7/2002 | Gillingham et al. |
| 2002/0187701 A1 | 12/2002 | Healey |
| 2003/0010002 A1 | 1/2003 | Johnson et al. |
| 2003/0203696 A1 | 10/2003 | Healey |
| 2004/0144710 A1 | 7/2004 | Bassett et al. |
| 2005/0082238 A1 | 4/2005 | Larson |
| 2006/0081229 A1 | 4/2006 | Gronberg et al. |
| 2006/0186031 A1 | 8/2006 | Fick et al. |
| 2007/0039300 A1 | 2/2007 | Kahlbaugh et al. |
| 2007/0062886 A1 | 3/2007 | Rego et al. |
| 2007/0062887 A1 | 3/2007 | Schwandt et al. |

FOREIGN PATENT DOCUMENTS

| | | |
|---|---|---|
| EP | 0428400 | 6/1995 |
| EP | 0682557 | 4/1997 |
| EP | 0616831 | 6/1999 |
| EP | 0960645 | 2/2000 |
| EP | 1270771 | 1/2003 |
| EP | 1198280 | 6/2003 |
| EP | 1173269 | 7/2003 |
| EP | 1050331 | 12/2003 |
| EP | 1133342 | 1/2004 |
| EP | 01048335 | 4/2005 |
| GB | 02015253 | 9/1979 |
| GB | 02194255 | 3/1988 |
| JP | 11-036169 | 2/1999 |
| PL | 172113 | 4/1995 |
| PL | 186112 | 9/1999 |
| WO | WO-95/13856 | 5/1995 |
| WO | WO-97/39817 | 10/1997 |
| WO | WO-00/29656 | 5/2000 |

| WO | WO-01/42549 | 6/2001 |
| WO | WO-02/20133 | 3/2002 |
| WO | WO-02/20668 | 3/2002 |

OTHER PUBLICATIONS

Tadeusz Jaroszczyk et al., "*Chapter 10 Cartridge Filtration*", in Filtration Principles and Practices, Second Edition, Revised and Expanded, Michael Matteson and Clyde Orr, eds., Marcel Dekker, Inc., New York, 1987, p. 547.

L. Spielman et al., "*Progress in Induced Coalescence and a New theoretical Framework for Coalescence by Porous Media*", Flow through Porous Media, R. Nunge, Chairman, ACS Publications, Washington, D.C., 1970.

L. Spielman et al., "*Theory of Coalescence by Flow through Porous Media*", Ind. Eng. Chem. Fundamentals, 11:66-72, 1972a.

L. Spielman et al., "*Experiments in Coalescence by Flow through Fibrous Mats*", Ind. Eng. Chem. Fundamentals, 11:73-83, 1972b.

L. Spielman et al., "*Coalescence in Oil-in-Water Suspensions by Flow Through Porous Media*", Ind. Eng. Chem. Fundamentals, 16:272-282, 1977.

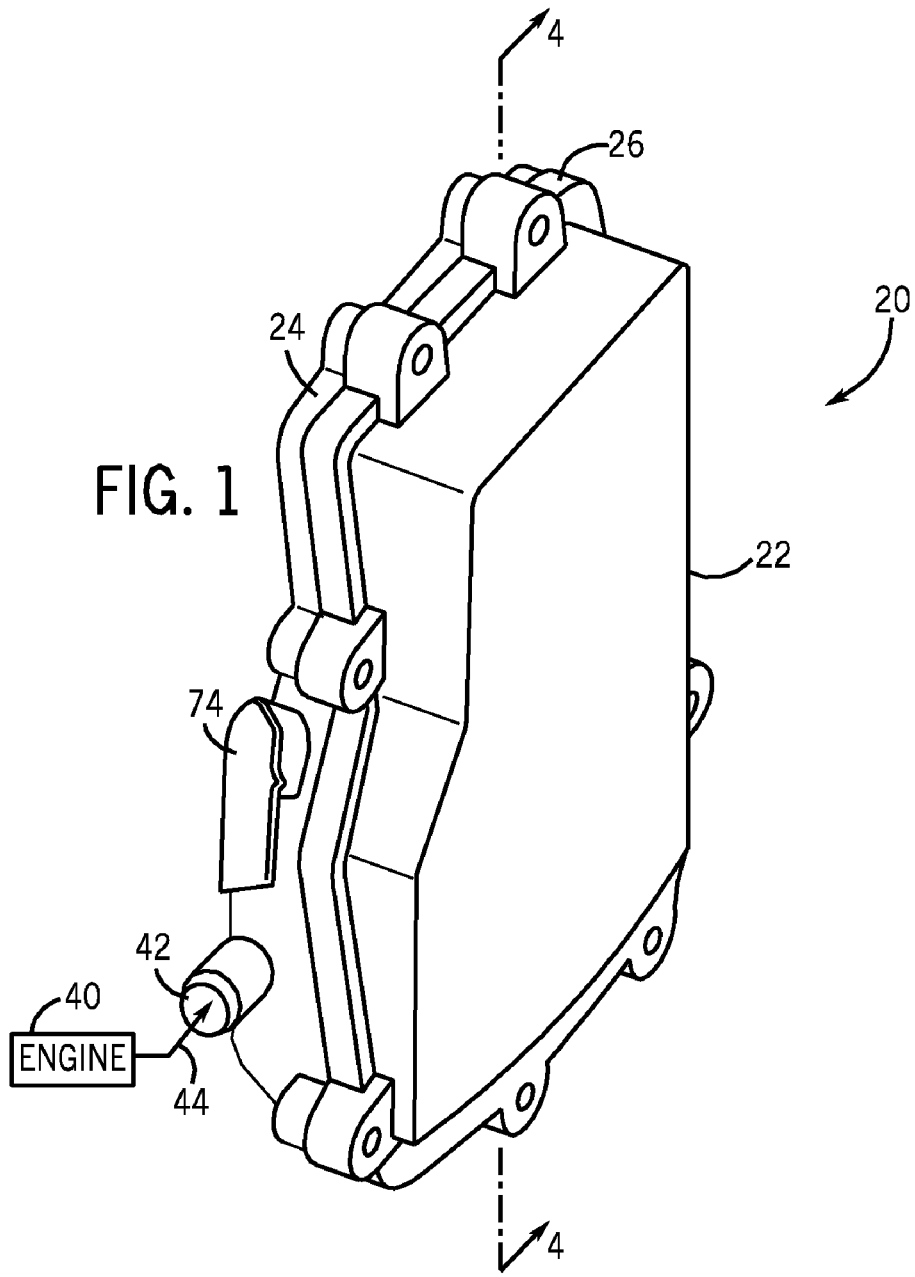
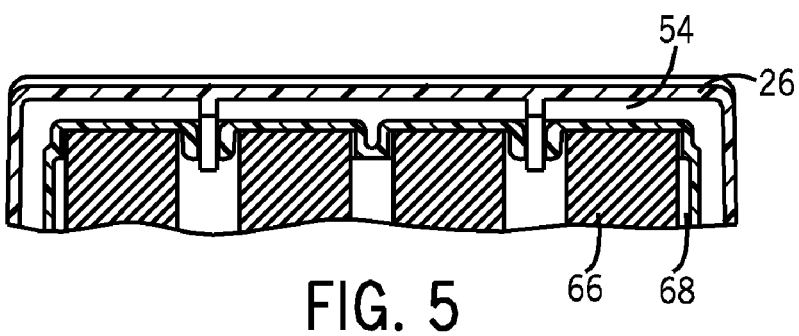

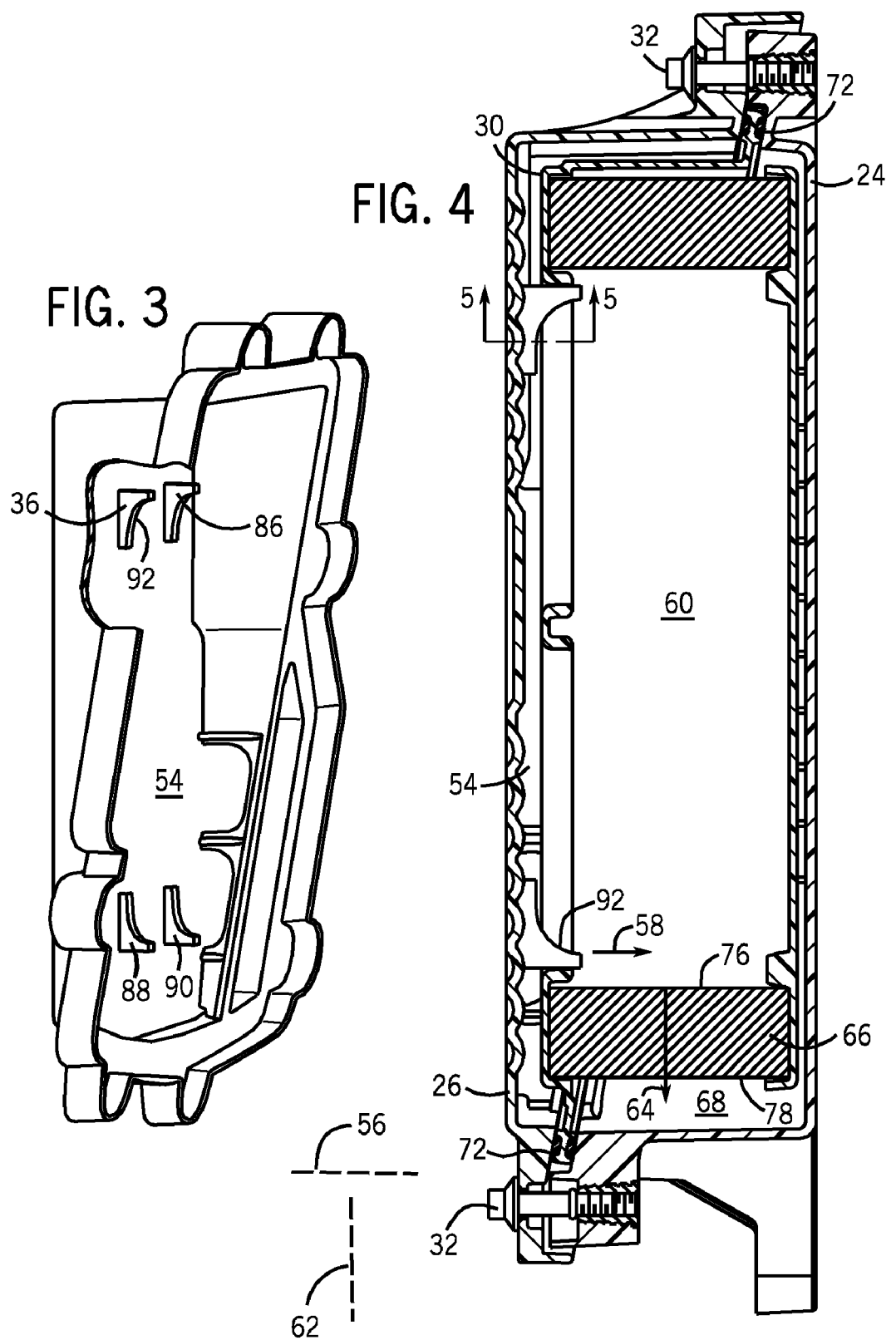

AUTHORIZED FILTER SERVICING AND REPLACEMENT

CROSS REFERENCE TO RELATED APPLICATION

This is a division of U.S. patent application Ser. No. 11/940,626 filed Nov. 15, 2007.

BACKGROUND AND SUMMARY

The invention relates to filters, servicing, and replacement, including internal combustion engine crankcase ventilation filters.

The invention arose during continuing development efforts directed toward authorized service and replacement of genuine coalescer filter elements in internal combustion engine crankcase ventilation filters, to assure continuing integrity of the coalescing filter function of separating air and oil in the crankcase gas air-oil mixture, though the present system has broader application and may be used for servicing various filters having replaceable filter elements.

BRIEF DESCRIPTION OF THE DRAWINGS

FIG. 1 is a perspective assembled view of a filter for use in accordance with the invention.

FIG. 3 is a perspective view of a component of FIG. 2 from a different angle.

FIG. 4 is a sectional view taken along line 4-4 of FIG. 1.

FIG. 5 is a sectional view taken along line 5-5 of FIG. 4.

DETAILED DESCRIPTION

Figure 2:
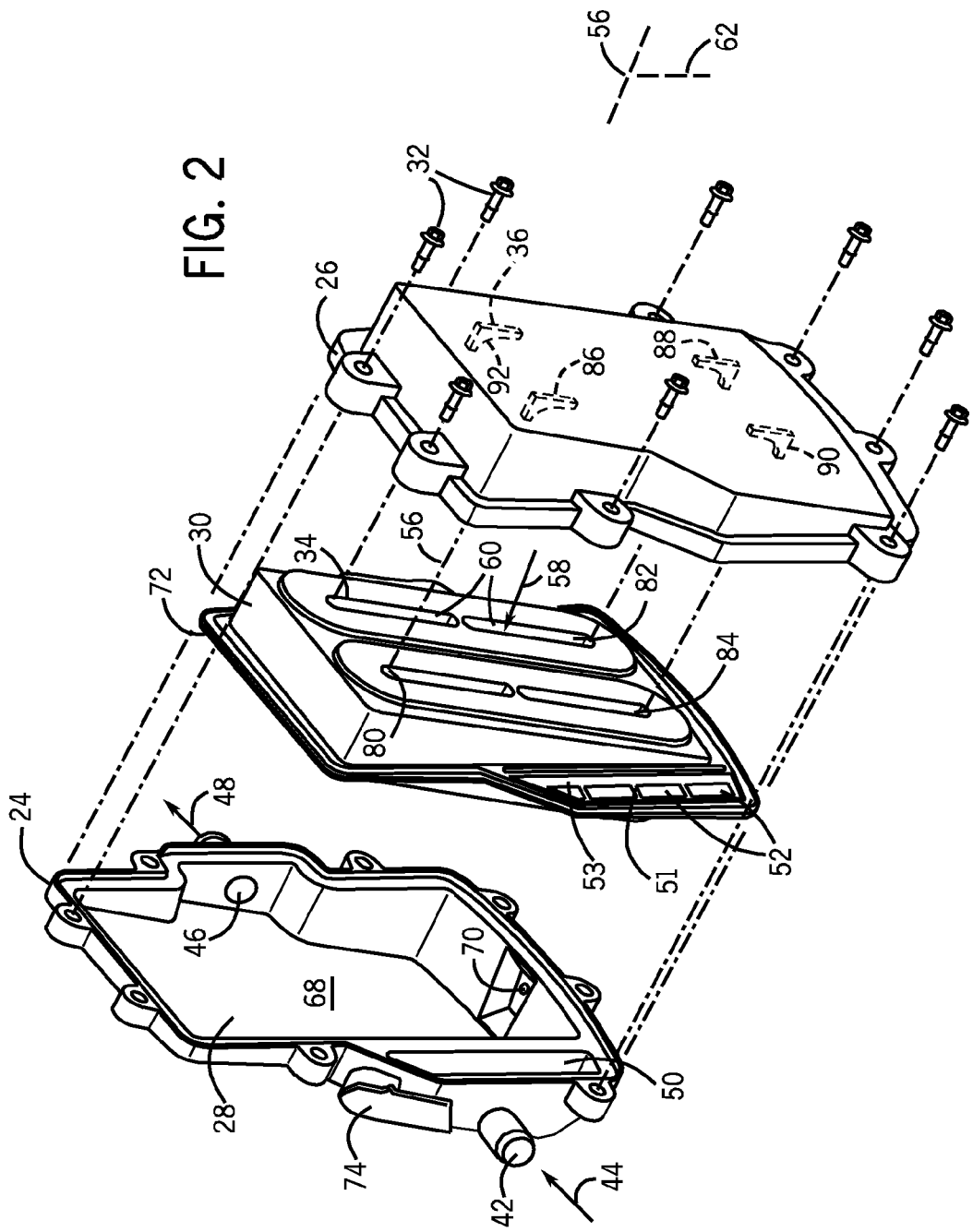
FIG. 2 is an exploded perspective view of the structure of FIG. 1.
Figure 6:
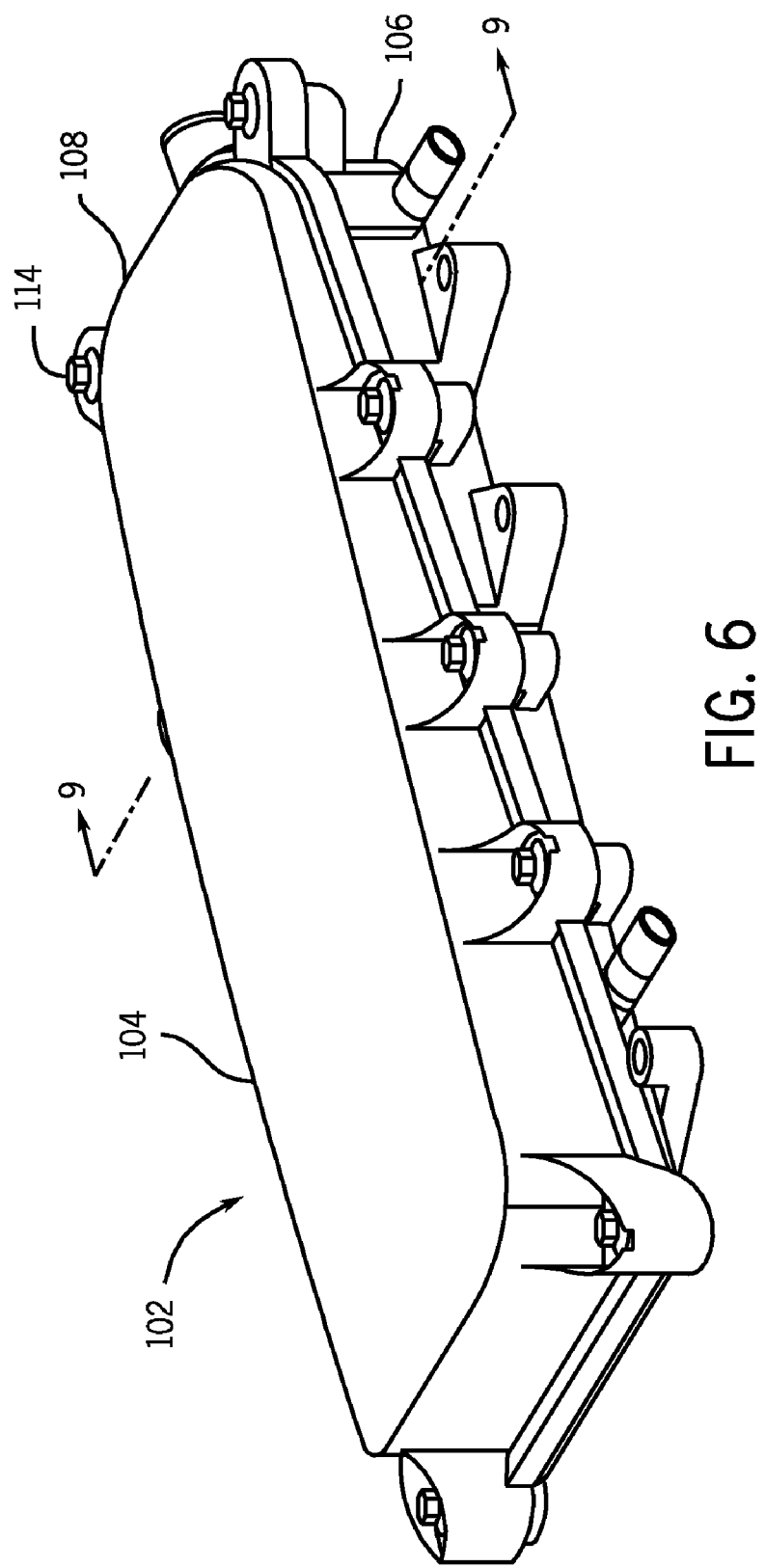
FIG. 6 is like FIG. 1 and shows another embodiment.

FIG. 1 shows an internal combustion engine crankcase ventilation filter 20 including a substantially planar low profile housing 22 having a mating base 24 and cover 26 defining a coalescing filter chamber 28, FIG. 2, retaining a coalescer filter element 30 when the base and cover are mated to each other, e.g. in assembled condition by mounting bolts 32. Filter element 30 and at least one of the cover and the base, preferably cover 26, have respective first and second detents 34 and 36 disabling mating and mounting of base 24 and cover 26 to each other with coalescer filter element 30 retained in coalescing filter chamber 28 unless the coalescer filter element 30 has the noted first detent 34 complementally interacting with the noted second detent 36.

Housing 22 has a flow path therethrough for crankcase gas from engine 40 extending from a housing air-oil inlet 42 as shown at arrow 44 then through coalescer filter element 30 then to a housing air outlet 46 as shown at arrow 48. The flow at inlet 42 enters an entry plenum 50 in base 24 and then flows through openings or windows 52 in a side flange 51 of the frame 53 of filter element 30 and then into upstream plenum 54 between cover 26 and filter element 30 and then along an axial direction 56 as shown at arrow 58, FIG. 2, into slots 60 of filter element 30 then laterally outwardly along lateral direction 62 as shown at arrow 64, FIG. 4, through coalescing filter media 66 into downstream plenum 68, for exit of air at housing air outlet 46, and for drainage of separated oil at housing drain oil outlet 70. The peripheral flange of the frame of filter element 30 is sealed along diagonal gasket 72 engaged between base 24 and cover 26 upon tightening of bolts 32. A pressure relief valve 74 may be provided at inlet or entry plenum 50 for alternate or bypass flow in the event filter element 30 clogs or otherwise becomes excessively restrictive. Coalescer filter element 30 has an upstream face 76, FIG. 4, receiving the air-oil mixture along the noted flow path, and has a downstream face 78 along which separated oil coalesces and from which separated air is discharged along the noted flow path. The flow path extends axially at 58 along axial direction 56 along upstream face 76, and then extends laterally at 64 along lateral direction 62 from upstream face 76 to downstream face 78. The plane of the substantially planar low profile housing 20 lies along the noted lateral direction 62 and requires only a small space for mounting in an engine compartment. The housing is preferably mounted vertically, or at least with drain outlet 70 at a lower downwardly disposed orientation. Coalescer filter element 30 extends along an extended lateral direction 62 in a racetrack shape at coalescing filter element 66 and has a hollow interior having a height extending along axial direction 56, and an extended longitudinal length extending along lateral direction 62 and defining the respective longitudinal slot 60.

The noted first detent 34 is preferably provided by slot 60 of the filter element. Second detent 36 is attached to cover 26, e.g. adhesively bonded thereto or integrally formed therewith, etc., and extends axially along axial direction 56 into slot 60. In the preferred embodiment, in addition to detent 34, additional detents are provided as shown at 80, 82, 84, each provided by a respective slot 60, and in addition to the detent at tab 36, additional detents are provided as shown at tabs 86, 88, 90, attached to cover 26. The detents are at upstream face 76 of the coalescing filter media 66 of filter element 30 and in the path of and impacted by the air-oil mixture. Detents 36, 86, 88, 90 have curved arcuate surfaces in axial cross-section, for example as shown at 92, FIGS. 2, 3, guiding and directing air-oil mixture flow therealong into slot 60.

Upon servicing, only an authorized replacement coalescer filter element can be used for internal combustion engine crankcase ventilation filter 20. The replacement coalescer filter element must have one or more detents 34, 80, 82, 84 complementally interacting with one or more respective detents 36, 86, 88, 90 upon mating of base 24 and cover 26 to each other. Mating of the base and cover to each other with a replacement coalescer filter element retained in coalescing filter chamber 28 is disabled unless the replacement coalescer filter element has the noted one or more detents 34, 80, 82, 84 complementally interacting with the noted one or more detents 36, 86, 88, 90 in coalescing filter chamber 28.

A method is provided for servicing internal combustion engine crankcase ventilation filter 20, including providing a substantially planar low profile housing 22 having a mating base 24 and cover 26 defining coalescing filter chamber 28 retaining coalescer filter element 30 when base 24 and cover 26 are mated to each other. The method includes providing the coalescer filter element 30 and at least a selected one of the cover and base, preferably cover 26, with respective complemental first and second detents 34 and 36, and disabling mating of base 24 and cover 26 to each other with coalescer filter element 30 retained in coalescing filter chamber 28 unless a coalescer filter element is selected having first detent 34 complementally interacting with second detent 36, and preferably with each of detents 34, 80, 82, 84 complementally interacting with respective detents 36, 86, 88, 90. First detent 34 is provided at one of the noted faces 76 and 78 of the filter element, preferably upstream face 76. Second detent 36 extends proximate face 76 and interfaces with detent 34 in keyed relation. The coalescer filter element is selected to have detent 34 complementally interact with detent 36 by interfacing therewith in keyed relation, and likewise for remaining detent pairs 80 and 86, 82 and 88, 84 and 90. The method further includes preventing the noted mating of base 24 and cover 26 in the absence of the noted interfacing in keyed relation of the noted detents. The method further includes selecting the noted selected one of the cover and base, preferably cover 26, to have the second detent 36 complementally interact with first detent 34 by interfacing therewith in keyed relation and likewise for the remaining noted detent pairs, and preventing the noted mating of base 24 and cover 26 in the absence of the noted interfacing in keyed relation of the detents. The method further includes assigning a specified first detent location along coalescer filter element 30, and locating first detent 34 at the first detent location such that detent 34 has a given first detent location relative to coalescer filter element 30, and likewise for remaining detents 80, 82, 84. The method further includes installing the coalescer filter element 30 by placing the coalescer filter element in coalescing filter chamber 28 at a specified element location therein such that detent 34 is located at a first detent position in coalescing filter chamber 28, and likewise for detents 80, 82, 84. The method further includes assigning a specified second detent location along the selected one of the cover and base, preferably cover 26, and locating detent 36 at the noted second detent location such that detent 36 has a given second detent location relative to the cover 26. The method further includes assembling cover 26 and base 24 in the noted mating relation such that detent 36 is located at a second detent position in coalescing filter chamber 28 and such that the noted first and second detent positions align in coalescing filter chamber 28, and the first and second detents 34 and 36 interface in keyed relation, and likewise for remaining detent pairs 80 and 86, 82 and 88, 84 and 90.

FIGS. 6-9 show a further embodiment. Internal combustion engine crankcase ventilation filter 102 includes a substantially planar low profile housing 104 having a mating base 106 and cover 108 defining a coalescing filter chamber 110 retaining a coalescer filter element 112 when the base and cover are mated to each other in assembled condition by mounting bolts 114. Coalescer filter element 112 and at least a selected one of the cover and base, preferably cover 108, have respective complemental first and second detents 116 and 118 disabling mating of base 106 and cover 108 to each other with coalescer filter element 112 retained in coalescing filter chamber 110 unless the coalescer filter element has first detent 116 complementally interacting with second detent 118.

Housing 104 has a flow path therethrough for crankcase gas from engine 120 extending from housing air-oil inlet 122 as shown at arrow 124 then through coalescer filter element 112 then to housing air outlet 126 as shown at arrow 128. The flow path from inlet 122 extends through port 130 in the frame 132 of filter element 112, which port 130 may includes an inertial impactor separator for pre-separation of oil from the crankcase gas stream, which pre-separated oil may collect in well 134 having an opening at the bottom thereof passing oil to a first oil outlet drain 136 in base 106 for drainage at outlet port 138. The crankcase gas flow from transfer port 130, with or without pre-separation, passes into upstream plenum 140 between cover 108 and filter element 112 and then passes axially downwardly in FIG. 7 along axial direction 142 as shown at arrow 144 into the hollow interior spaces of the coalescing filter media of the filter element at slots 146 and then laterally along lateral direction 148 as shown at arrow 150, FIG. 9, through the coalescing filter media 152 to downstream plenum 154 for exit of air at air outlet 126 as shown at arrow 128, and exit of coalesced oil at oil outlet 156. The outer peripheral flange of the frame of filter element 112 is sealed at diagonally extending gasket 158 engaged between cover 108 and base 106. Housing 104 sits generally horizontally in the engine compartment, e.g. on top of a cylinder head, or at a given angle with drains 138, 156 preferably at a lower location pointing at least partially downwardly. Coalescing filter media 152 of filter element 112 has an upstream face 160 receiving the air-oil mixture along the noted flow path, and has a downstream face 162 along which separated oil coalesces and from which separated air is discharged along the noted flow path. The flow path extends axially as shown at arrow 144 along axial direction 142 along upstream face 160 of the filter media, and then extends laterally as shown at arrow 150 along lateral direction 148 from upstream face 160 to downstream face 162. The plane of substantially planar low profile housing 104 lies along lateral direction 148. Coalescer filter element 112 at filter media 152 extends along an extended lateral direction 164 in a racetrack shape having one or more hollow interiors 146 each having a height extending along axial direction 142, and an extended longitudinal length extending along lateral direction 164 and defining the respective slot 146.

First detent 116 is provided by the noted slot 146. Second detent 118 is provided by a tab attached to the noted selected one of the cover and base, preferably cover 106, e.g. adhesively bonded thereto or integrally formed therewith, etc., and extending axially into slot 146. In the preferred embodiment, filter element 112 has the noted detent 116 and additionally has further detents 166, 168, 170 provided by respective slots. Further in the preferred embodiment, cover 106 has detent 118 provided by the noted tab attached thereto and additionally has detent tabs 172, 174, 176 attached thereto, and extending axially into respective slots providing respective detents 116, 166, 168, 170. Detents 116 and 118 are at upstream face 160 of the coalescing filter media 152 of the filter element and in the path of and impacted by the air-oil mixture, as are respective detent pairs 166 and 172, 168 and 174, 170 and 176. Detent 118 has a curved arcuate surface in axial cross-section guiding and directing air-oil mixture therealong into slot 146. The remaining detents provided by the respective tabs 172, 174, 176 are comparable.

In the embodiment of FIGS. 6-9, in addition to the noted first and second detents 116 and 118, a third detent 180 on coalescer filter element 112 is laterally spaced from first detent 116 and also laterally spaced from each of the noted upstream and downstream faces 160 and 162 of coalescing filter media 152 of the filter element. A fourth detent 182 is provided on a given one of the cover and base, preferably cover 108, and is laterally spaced from second detent 118 and complementally interacts with third detent 180 upon mating of cover 108 and base 106 in assembled condition by mounting bolts 114. First detent 116, second detent 118, third detent 180, and fourth detent 182 prevent mating of base 106 and cover 108 to each other with coalescer filter element 112 retained in coalescing filter chamber 110 unless the coalescer filter element has both: a) the first detent 116 complementally interacting with second detent 118 extending axially thereinto; and b) third detent 180 complementally interacting with fourth detent 182.

Figure 7:
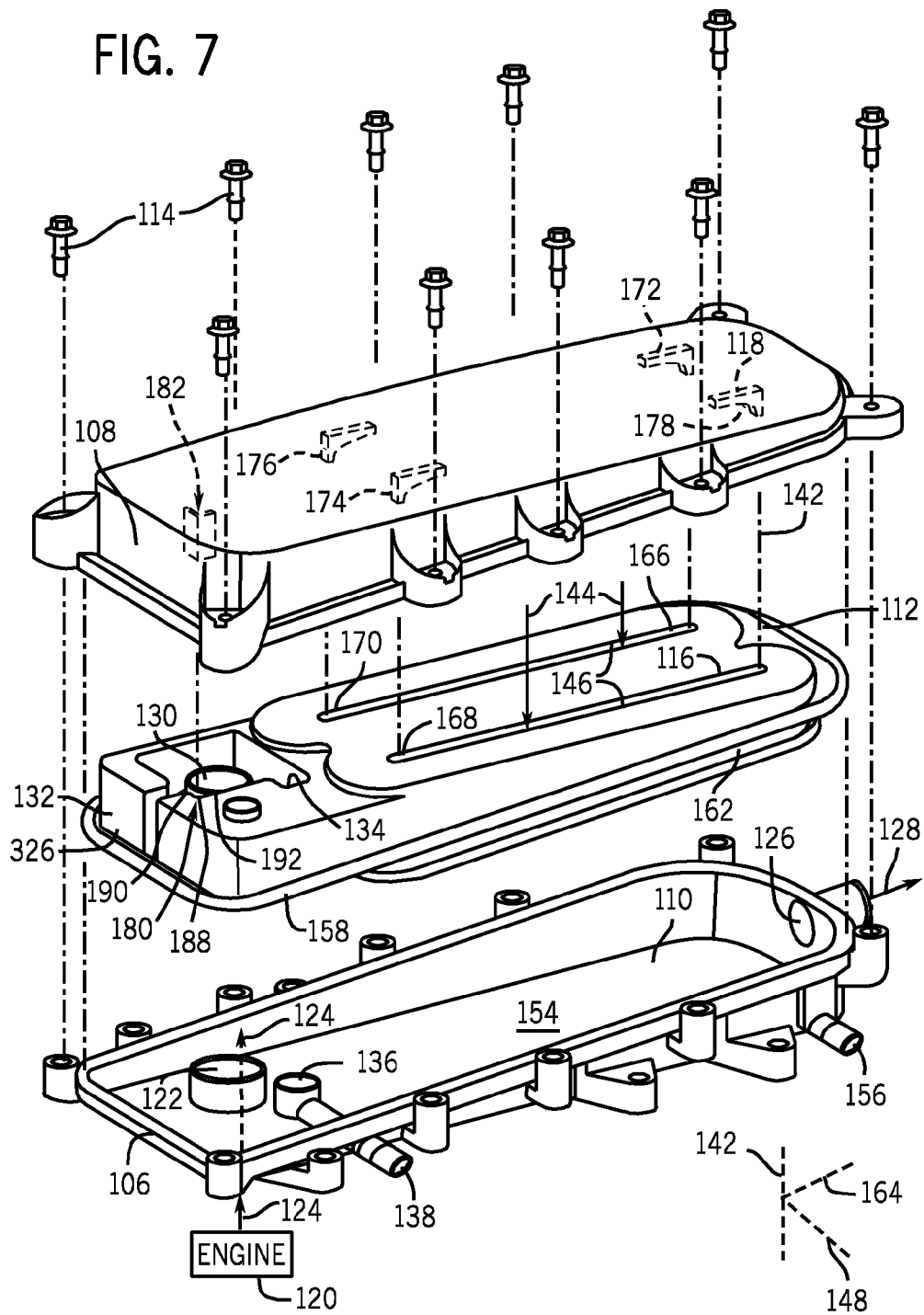
FIG. 7 is an exploded perspective view of the structure of FIG. 6.
Figure 8:
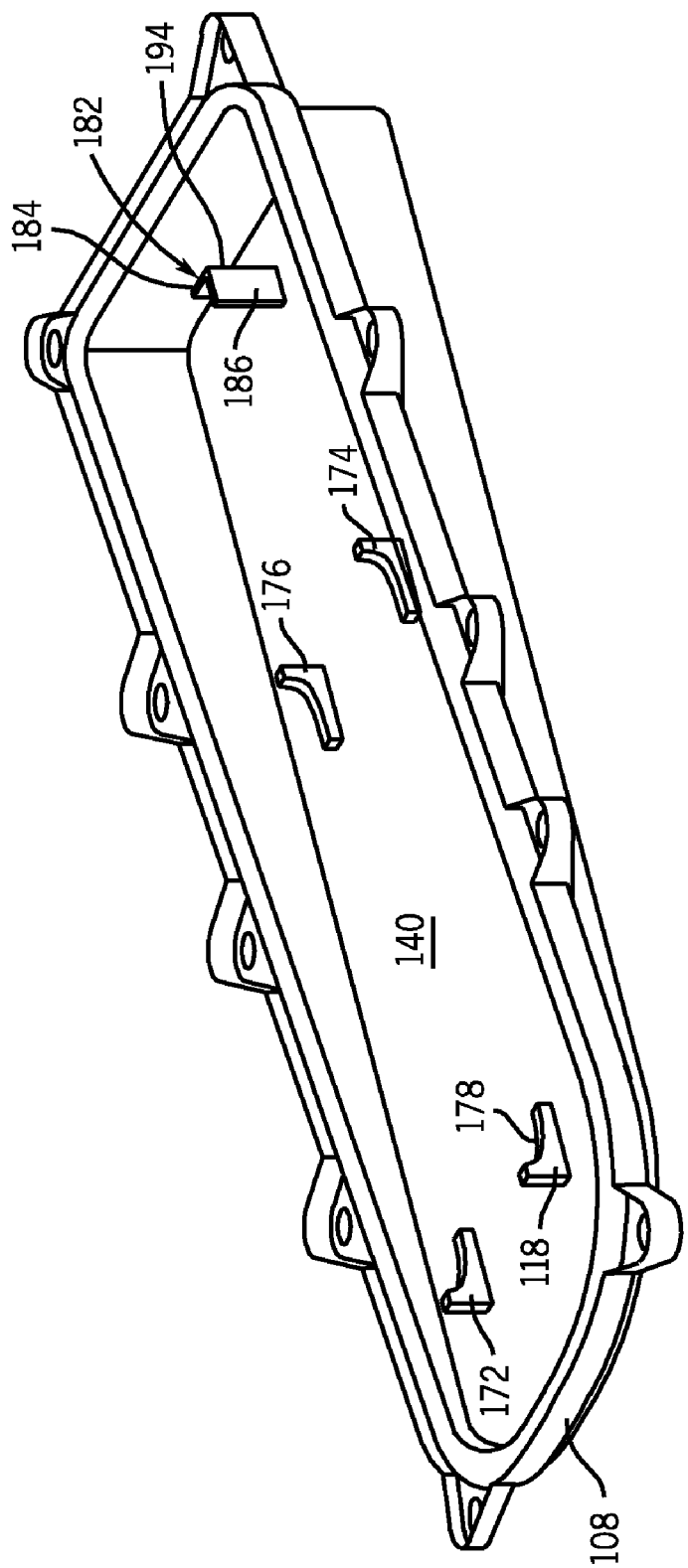
FIG. 8 is a perspective view of a component of FIG. 7 from a different angle.
Figure 9:
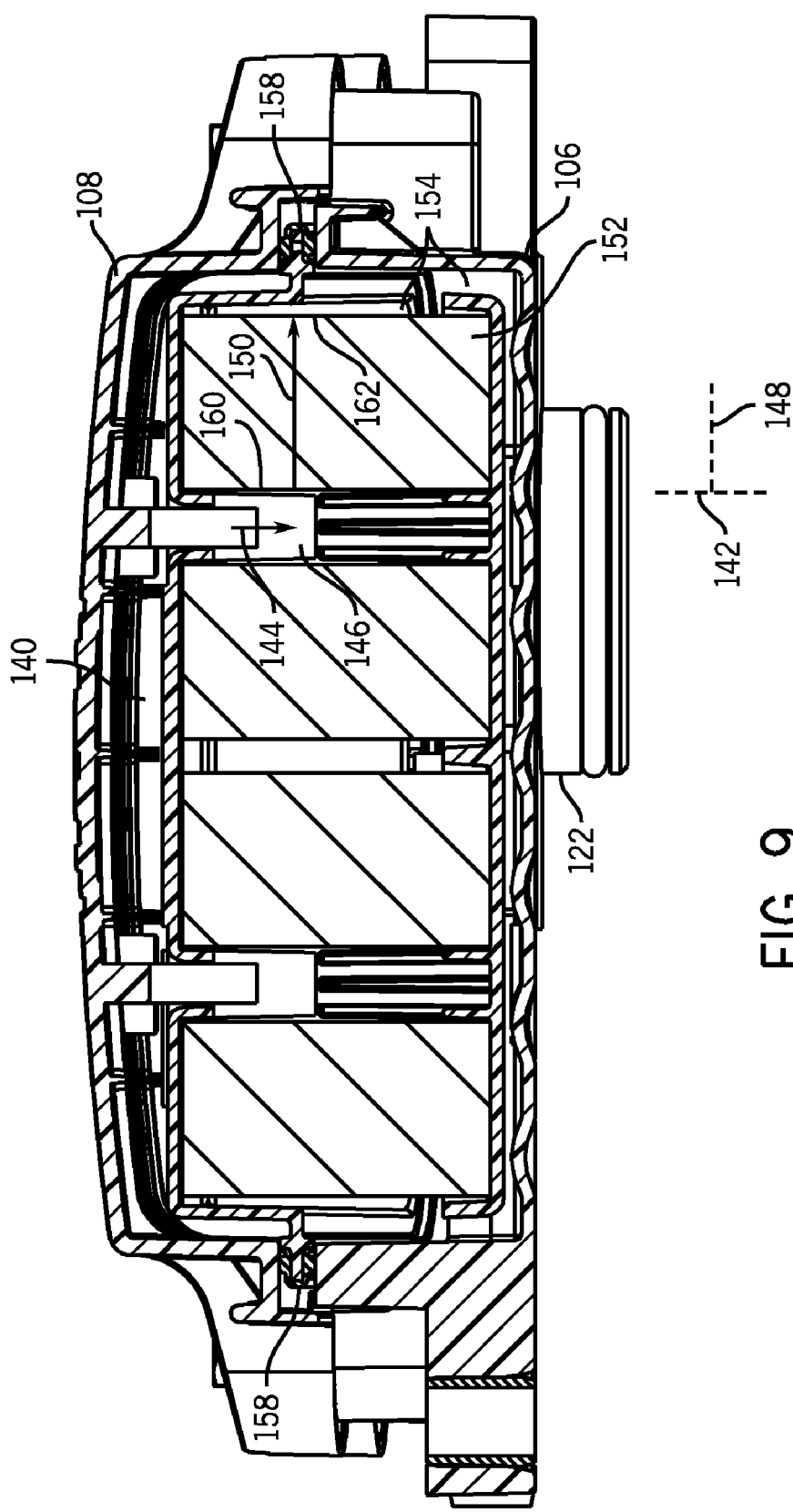
FIG. 9 is a sectional view taken along line 9-9 of FIG. 6.

The noted fourth detent 182, FIGS. 7, 8, is preferably provided by an axially extending tab attached to cover 108, e.g. adhesively bonded thereto or integrally formed therewith, etc. The noted third detent 180 is preferably provided by a retaining wall forming well 134 and receiving tab 182 extending axially therealong. Tab 182 has an L-shape in lateral cross-section, the L-shape having first and second legs 184 and 186. The noted retaining wall at 180 is provided by a corner segment 188 of the well 134 having first and second wall sections 190 and 192 meeting at a junction at 188 and complementally receiving at least one of the noted legs 184 and 186. In the preferred embodiment, legs 184 and 186 meet at a joint 194 extending axially therealong along axial direction 142. First leg 184 extends axially along first wall section 190. Second leg 186 extends axially along second wall section 192. Junction 188 receives joint 194 extending axially therealong.

For servicing, an authorized replacement coalescer filter element 112 must be used for the internal combustion engine crankcase ventilation filter 102. The replacement coalescer filter element must have first detent 116 complementally interacting with second detent 118 upon mating of base 106 and cover 108 to each other. The system disables the noted mating of base 106 and cover 108 to each other with replacement coalescer filter element 112 retained in coalescing filter chamber 110 unless the replacement coalescer filter element has the noted first detent 116 complementally interacting with the noted second detent 118 in the coalescing filter chamber. In the preferred embodiment, other detent pair conditions must be met, namely other detent pairs must also complementally interact with each other, namely detent pairs 166 and 172, 168 and 174, 170 and 176, 180 and 182.

A method is provided for servicing internal combustion engine crankcase ventilation filter 102, including providing a substantially planar low profile housing 104 having a mating base 106 and cover 108 defining a coalescing filter chamber 110 retaining a coalescer filter element 112 when the base and cover are mated to each other in assembled condition by mounting bolts 114. The method includes providing the coalescer filter element 112 and at least one of the cover and base, preferably cover 108, with respective complemental first and second detents 116 and 118, and disabling mating of base 106 and cover 108 to each other with coalescer filter element 112 retained in coalescing filter chamber 110 unless a coalescer filter element is selected having first detent 116 complementally interacting with second detent 118. The method includes selecting the coalescer filter element to have first detent 116 complementally interact with second detent 118 by interfacing therewith in keyed relation. The method includes preventing the mating of base 106 and cover 108 in the absence of the noted interfacing in keyed relation of the first and second detents 116 and 118. The method includes selecting the noted selected one of the cover and base, preferably cover 108, to have the noted second detent 118 complementally interact with the first detent 116 by interfacing therewith in keyed relation. The method includes preventing the noted mating of base 106 and cover 108 in the absence of the noted interfacing in keyed relation of detents 116 and 118. In the preferred embodiment, the method includes providing a third detent such as 180 on the coalescer filter element 112, and providing a fourth detent such as 182 on a given one of the cover and base, preferably cover 108. In such embodiment, the method includes disabling the mating of base 106 and cover 108 to each other with the coalescer filter element 112 retained in coalescing filter chamber 110 unless a coalescer filter element is selected having both: a) the first detent 116 complementally interacting with the second detent 118; and b) the third detent 180 complementally interacting with the fourth detent 182. The method includes assigning a specified first detent location along coalescer filter element 112, and locating the first detent 116 at the first detent location such that the first detent 116 has a given first detent location relative to coalescer filter element 112. The method includes installing coalescer filter element 112 by placing the coalescer filter element in the coalescing filter chamber 110 at a specified element location therein such that the first detent 116 is located at a first detent position in coalescing filter chamber 110. The method includes assigning a specified second detent location along the noted selected one of the cover and base, preferably cover 108, and locating the second detent 118 at the second detent location such that the second detent 118 has a given second detent location relative to cover 108. The method includes assembling cover 106 and base 108 in mating relation such that the second detent 118 is located at the noted second detent position in coalescing filter chamber 110 and such that the noted first and second detent positions align in coalescing filter chamber 110, and the first and second detents 116 and 118 interface in keyed relation.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. The structure and methodology herein may be used beyond internal combustion engine crankcase ventilation filter applications to other filter applications and servicing and replacement filter elements therefor. Other embodiments are envisioned that may include other possible features, such as complementally interacting protuberances, keyed interlocking fingers, male-female connections, plastic pegs, prongs, hooks, clamping structures, integrated interlocking edges, and other structural devices which receivably interact with one another, as well as other structures providing the functions herein or functional equivalents thereof.

What is claimed is:

1. An internal combustion engine crankcase ventilation filter comprising a substantially planar low profile housing having a mating base and cover defining a coalescing filter chamber retaining a coalescer filter element when said base and said cover are mated to each other, said coalescer filter element and at least a selected one of said cover and said base having respective complemental first and second detents disabling mating of said base and said cover to each other with said coalescer filter element retained in said coalescing filter chamber unless said coalescer filter element has said first detent complementally interacting with said second detent, said housing having a flow path therethrough for crankcase gas from said engine, said flow path extending from a housing air-oil inlet then through said coalescer filter element then to a housing air outlet said coalescer filter element having an upstream face receiving an air-oil mixture along said flow path, and a downstream face along which said separated oil coalesces and from which said separated air is discharged along said flow path, said first detent is at one of said faces, said second detent extends proximate said one face and interfaces with said first detent in keyed relation, said second detent including a directional guide surface guiding and directing flow therealong and also turning the flow from a first flow direction to a second flow direction.

2. The internal combustion engine crankcase ventilation filter according to claim 1 wherein:
said flow path extends axially along an axial direction along said upstream face, and extends laterally along a lateral direction from said upstream face to said downstream face;
the plane of said substantially planar low profile housing lies along said lateral direction;
said coalescer filter element extends along an extended lateral direction in a racetrack shape having a hollow interior having a height extending along said axial direction and an extended longitudinal length extending along said lateral direction and defining a longitudinal slot;
said first detent comprises said slot; and
said second detent extends axially into said slot.

3. The internal combustion engine crankcase ventilation filter according to claim 2 wherein said first and second detents are at said upstream face and in the path of and impacted by said air-oil mixture.

4. The internal combustion engine crankcase ventilation filter according to claim 2 comprising:
a third detent on said coalescer filter element and laterally spaced from said first detent at said slot and also laterally spaced from each of said upstream and downstream faces;
a fourth detent on a given one of said cover and said base and laterally spaced from said second detent and complementally interacting with said third detent upon mating of said cover and said base;
wherein said first, second, third, and fourth detents prevent mating of said base and said cover to each other with said coalescer filter element retained in said coalescing filter chamber unless said coalescer filter element has both:
a) said first detent at said slot complementally interacting with said second detent extending axially thereinto; and
b) said third detent complementally interacting with said fourth detent.

5. The internal combustion engine crankcase ventilation filter according to claim 2 wherein said second detent has a curved arcuate surface in axial cross-section guiding and directing air-oil mixture flow therealong into said slot.

6. The internal combustion engine crankcase ventilation filter according to claim 4 wherein said fourth detent comprises an axially extending tab, and said third detent comprises a retaining wall receiving said tab extending axially therealong.

7. The internal combustion engine crankcase ventilation filter according to claim 6 wherein:
said tab has an L-shape in lateral cross-section, said L-shape having first and second legs; and
said retaining wall comprises a corner segment having first and second wall sections meeting at a junction and complementally receiving at least one of said legs.

8. The internal combustion engine crankcase ventilation filter according to claim 7 wherein:
said first and second legs meet at a joint;
said junction receives said joint extending axially therealong;
said first leg extends axially along said first wall section; and
said second leg extends axially along said second wall section.

9. A replacement coalescer filter element for the internal combustion engine crankcase ventilation filter according to claim 1 wherein said replacement coalescer filter element has said first detent complementally interacting with said second detent upon mating of said base and said cover to each other and disables said mating of said base and said cover to each other with said replacement coalescer filter element retained in said coalescing filter chamber unless said replacement coalescer filter element has said first detent complementally interacting with said second detent in said coalescing filter chamber.

10. The replacement filter element according to claim 9 wherein:
said housing has a flow path therethrough for crankcase gas from said engine, said flow path extending from a housing air-oil inlet then through said coalescer filter element then to a housing air outlet;
said coalescer filter element has an upstream face receiving an air-oil mixture along said flow path, and a downstream face along which separated oil coalesces and from which separated air is discharged along said flow path;
said flow path extends axially along an axial direction along said upstream face, and extends laterally along a lateral direction from said upstream face to said downstream face;
the plane of said substantially planar low profile housing lies along said lateral direction;
said coalescer filter element extends along an extended lateral direction in a racetrack shape having a hollow interior having a height extending along said axial direction and an extended longitudinal length extending along said lateral direction and defining a longitudinal slot;
said first detent comprises said slot; and
said second detent extends axially into said slot.

11. The internal combustion engine crankcase ventilation filter according to claim 1 wherein said second flow direction is along said upstream face.

12. The internal combustion engine crankcase ventilation filter according to claim 11 wherein said flow path extends along a first sequential direction to said second detent and then extends along a second sequential direction axially along an axial direction along said upstream face and then extends along a third sequential direction laterally along a lateral direction through said coalescing filter element from said upstream face to said downstream face.

13. The internal combustion engine crankcase ventilation filter according to claim 12 wherein said first sequential direction extends laterally and is parallel to said third sequential direction, and said directional guide surface of said second detent turns said flow from said first sequential direction to said second sequential direction.

14. The internal combustion engine crankcase ventilation filter according to claim 13 wherein said directional guide surface of said second detent is curved along a curved arcuate surface in axial cross-section.

15. An internal combustion engine crankcase ventilation filter comprising a substantially planar low profile housing having a mating base and cover defining a coalescing filter chamber retaining a coalescer filter element when said base and said cover are mated to each other, said coalescer filter element and at least a selected one of said cover and said base having respective complemental first and second detents disabling mating of said base and said cover to each other with said coalescer filter element retained in said coalescing filter chamber unless said coalescer filter element has said first detent complementally interacting with said second detent, said housing having a flow path therethrough for crankcase gas from said engine, said flow path extending from a housing air-oil inlet then through said coalescer filter element then to a housing air outlet, said coalescer filter element having an upstream face receiving an air-oil mixture along said flow path, and a downstream face along which said separated oil coalesces and from which said separated air is discharged along said flow path, wherein said second detent is at said upstream face and interfaces with said first detent in keyed relation.

16. The internal combustion engine crankcase ventilation filter according to claim 15 wherein said second detent includes a directional guide surface guiding and directing flow therealong and also turning the flow from a first flow direction to a second flow direction, wherein said second flow direction is along said upstream face.

17. An internal combustion engine crankcase ventilation filter comprising a substantially planar low profile housing having a mating base and cover defining a coalescing filter chamber retaining a coalescer filter element when said base and said cover are mated to each other, said coalescer filter element and at least a selected one of said cover and said base having respective complemental first and second detents disabling mating of said base and said cover to each other with said coalescer filter element retained in said coalescing filter chamber unless said coalescer filter element has said first detent complementally interacting with said second detent, said housing having a flow path therethrough for crankcase gas from said engine, said flow path extending from a housing air-oil inlet then through said coalescer filter element then to a housing air outlet, said coalescer filter element having an upstream face receiving an air-oil mixture along said flow path, and a downstream face along which said separated oil coalesces and from which said separated air is discharged along said flow path, wherein said coalescer filter element is a closed-loop defining a hollow interior, and said second detent is at said hollow interior and interfaces with said first detent in keyed relation.

18. The internal combustion engine crankcase ventilation filter according to claim 17 wherein said second detent includes a directional guide surface guiding and directing flow therealong and also turning the flow from a first flow direction to a second flow direction, wherein one of said directions is along said hollow interior.

19. An internal combustion engine crankcase ventilation filter comprising a substantially planar low profile housing having a mating base and cover defining a coalescing filter chamber retaining a coalescer filter element when said base and said cover are mated to each other, said coalescer filter element and at least a selected one of said cover and said base having respective complemental first and second detents disabling mating of said base and said cover to each other with said coalescer filter element retained in said coalescing filter chamber unless said coalescer filter element has said first detent complementally interacting with said second detent, said housing having a flow path therethrough for crankcase gas from said engine, said flow path extending from a housing air-oil inlet then through said coalescer filter element then to a housing air outlet, said coalescer filter element having an upstream face receiving an air-oil mixture along said flow path, and a downstream face along which separated oil coalesces and from which said separated air is discharged along said flow path, wherein said coalescer filter element extends along an extended lateral direction in a racetrack shape having a hollow interior having a height extending along an axial direction and an extended longitudinal length extending along said lateral direction and defining a longitudinal slot hollow interior, wherein said second detent extends into said longitudinal slot hollow interior.

20. The internal combustion engine crankcase ventilation filter according to claim 19 wherein said second detent includes a directional guide surface guiding and directing flow therealong and also turning the flow from a first flow direction to a second flow direction, wherein one of said flow directions is along said axial direction in said longitudinal slot hollow interior, and the other of said flow directions is along said lateral direction adjacent said longitudinal slot hollow interior.

* * * * *